(No Model.)
J. Q. A. HANEY.
VEHICLE RUNNING GEAR.
No. 498,112. Patented May 23, 1893.
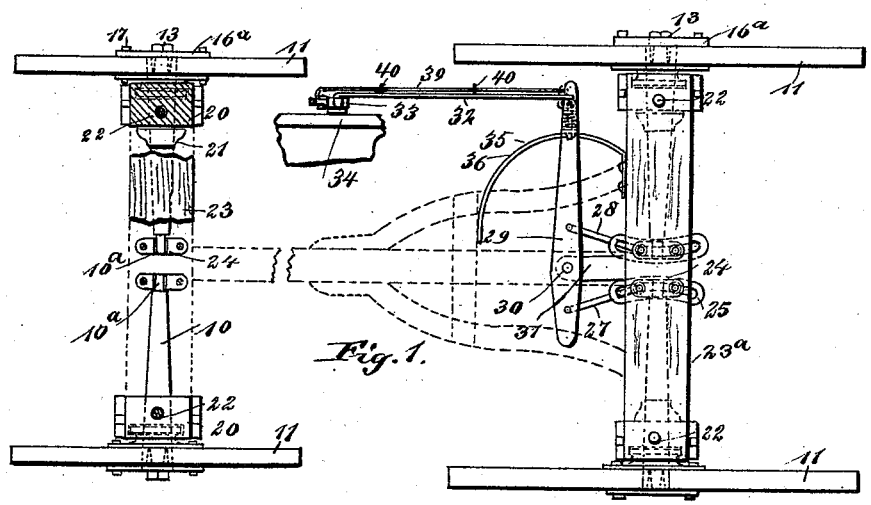
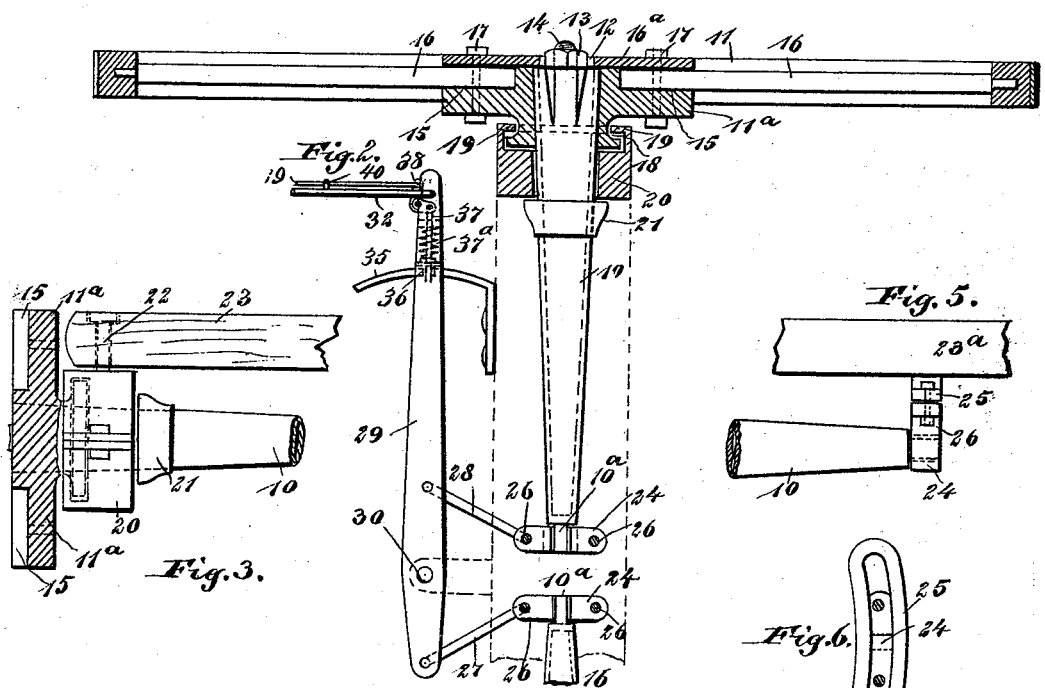
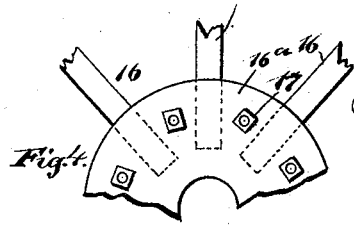
WITNESSES:
F. McArdle
A. Sedgwick
INVENTOR
J. Q. A. Haney
BY Munn & Co
ATTORNEYS.

United States Patent Office.

JOHN Q. A. HANEY, OF BUCKHANNON, WEST VIRGINIA.

VEHICLE RUNNING-GEAR.

SPECIFICATION forming part of Letters Patent No. 498,112, dated May 23, 1893.

Application filed December 21, 1892. Serial No. 455,926. (No model.)

*To all whom it may concern:*

Be it known that I, JOHN Q. A. HANEY, of Buckhannon, in the county of Upshur and State of West Virginia, have invented a new and Improved Running-Gear, of which the following is a full, clear, and exact description.

My invention relates to improvements in the running gear of vehicles, and the objects of my invention are to construct the running gear of a vehicle so that it will be strong and durable and at the same time cheap, to arrange the several parts so that the gear will be especially adapted for rough and uneven roads, and to provide means for automatically turning the rear wheels when the forward wheels are turned, to the end that the gear may be made to easily pass around a corner or to adapt it to any inequalities of the road.

To this end my invention consists of certain features of construction, and combinations of parts, as will be hereinafter described and claimed.

Reference is to be had to the accompanying drawings forming a part of this specification, in which similar figures of reference indicate corresponding parts in all the views.

Figure 1 is a broken plan view of the running gear embodying my invention. Fig. 2 is an enlarged sectional plan of one of the rear wheels and its connecting axle and lever mechanism. Fig. 3 is an enlarged cross section of the wheel hub, showing also the mechanism for supporting the axle which connects with the hub. Fig. 4 is a broken front elevation of the hub. Fig. 5 is a broken detail view in elevation of the sliding mechanism for supporting the inner end of the axle; and Fig. 6 is a plan view of the axle slides.

The running gear is provided with half axles 10, or rather a single and independent axle for each wheel 11, and each axle is fixed to the wheel at its outer end. The wheel 11 has a hub $11^a$, which is preferably of malleable iron, and the wheel hub and axle are secured together by means of keys 12, which are held in place by a nut 13 on a bolt 14, which is secured centrally in the end of the axle. The outer face of the hub is recessed as shown at 15, to receive the inner ends of the spokes 16, and the outer face of the hub is covered by an annular flange $16^a$, which fits snugly against the outer sides of the spokes and is held in place by bolts 17, which project between the spokes and extend through the flange and through the opposite portion of the hub $11^a$. It will be seen therefore, that the flange and the hub form practically a pair of jaws, and when the nuts on the bolts 17 are tightened the parts are clamped to the spokes so as to hold them immovably in place. The inner end of the hub has an annular recess 18, around it to receive the flange 19, on the outer end of the bearing box 20, which supports the outer end of the axle, and the flange 19 thus serves as a dust guard, which prevents the dust or dirt from getting into the bearing.

The box 20 may be provided with any suitable oil hole, and it is prevented from moving inward by a fixed collar 21, on the axle 10. The box is pivotally supported from the axle bed or bolster 23 above it by means of a bolt 22, as best shown in Fig. 3, and the wheel may thus turn laterally in relation to the vehicle body and bolster.

The inner ends of the axles 10 are reduced as shown at $10^a$, and held to turn in boxes 24, the boxes on the front axles being fixed to the axle bed or bolster 23 to which the vehicle tongue or shafts may be secured in any ordinary way. The boxes 24 of the rear axles are however, held to slide on curved slideways 25, which are secured beneath the axle bed $23^a$, as shown in Figs. 1 and 5, the boxes being held to the slideways by means of bolts 26, although any well-known form of slide may be used. The sliding boxes 24 on the rear axles are connected by forwardly-extending rods 27 and 28 with a lever 29, which extends transversely beneath the vehicle and nearly parallel with the axles, this lever being fulcrumed as shown at 30, on a forwardly-extending arm 31 carried by the bed $23^a$.

It will be noticed that the connecting rod 27 is arranged on one side of the fulcrum 30, and the rod 28 on the other side, so that when the inner end of one axle is moved forward the inner end of the opposite axle will be moved backward, and provision thus made for easy turning. The free end of the lever 29 is pivoted to a rod 32 which extends forward along the side of the body of the vehicle, which may be carried on the running gear, and the front end of the rod is pivoted to a lever 33 fulcrumed on the side of the body 34, as shown in Fig. 1. The lever 29 slides over a quadrant 35 which is secured to the bed 23ª and to the reach, this quadrant having slots 36 therein adapted to receive a fastening latch 37 which is normally pressed into engagement with the notches by a spring 37ª, see Fig. 2, and the latch is operated by a bell crank 38 which is pivoted on the free end of the lever 29, and the bell crank is operated by a rod 39 which slides in keepers 40 on the rod 32, and which is adapted to be operated by the usual latch lever on the body 34.

The latch 37, the latch lever, and their connections with the rods 32 and 39, are not shown in detail as they are like the ordinary brake and latch levers and are not claimed in detail as a part of this invention. It will be understood too that any suitable lever mechanism may be substituted for that mentioned. The latch 37, by engaging the notches 36, locks the lever 29, and when the latter is to be moved, the latch 37 is drawn out by means of the rod 39 and its operating lever, after which, by swinging the lever 34, the lever 39 may be operated so as to swing the rear axles horizontally and turn the rear wheels in a way to facilitate the steering and turning of the wagon.

In practice the axles 10 are made hollow so that they will not be unnecessarily heavy, and the boxes 20 which support the axles are placed very near the line of the spokes as shown in the drawings, so that the gear will be very strong, and as the wheels cannot play on the axle, and the axles have no lateral motion to speak of, all the side motion usual to running gears will be dispensed with.

Having thus fully described my invention, I claim as new and desire to secure by Letters Patent—

1. In a running gear the wheel hub 11ª having spoke recesses 15 on its outer face, and an annular groove 18 around its inner end, an annular plate 16ª closing the recesses 15 and bolted to the said hub, an axle 10 rigidly secured to the hub, a box 20 in which the axle freely turns and provided with an annular flange 19 at its outer end entering the annular hub groove 18, substantially as set forth.

2. In a running gear the wheel 11 having a hub 11ª grooved on its outer face and receiving the inner ends of the spokes, an annular plate 16 bolted to the outer face of the hub over said spoke ends, the inner end of the hub having an annular groove 18 around it, the axle 10 extending at its outer end through the hub and terminating in a bolt 14 and the keys 12 connecting the hub and axle, and the nut 13 on said bolt and holding the keys in place, substantially as set forth.

3. A running gear, comprising a forward bolster having axles journaled beneath it, the axles carrying wheels at their outer ends, a rear axle bed, independent axles held beneath the rear axle bed, the axles having their outer ends journaled in boxes which are pivoted on the bed and their inner ends journaled in sliding boxes, and a hand operated lever mechanism for swinging the rear axles, to cause the rear axles to track in unison with the front axles when turning curves substantially as described.

4. The combination with the rear axle bed and the independent axles having wheels at their outer ends and their inner ends held to slide beneath the bed, of a horizontally-swinging lever fulcrumed adjacent to the bed, rods connecting the lever with the sliding ends of the axles, an operative connection between the lever and a hand lever on the vehicle, and means, as a quadrant and latch, for fastening the horizontal lever, whereby the rear wheels may be made to track in unison with the front wheels in turning curves substantially as described.

5. In a running gear, the combination of the axle having a wheel fixed to its outer end, said wheel having an annular groove on the inner end of its hub, a bearing box for the axle, said box being journaled on the outer end of the axle and having a flange to fit the groove of the wheel hub, and a support for the axle box, substantially as described.

6. The combination of the axle having a wheel fixed to its outer end, the wheel hub having an annular recess around its inner end, a box pivoted to a support and held to support the axle, a flange produced on the outer end of the box and adapted to engage the groove of the hub, and a collar on the axle at the inner end of the box, substantially as described.

JOHN Q. A. HANEY.

Witnesses:
L. B. STEVENS,
J. J. KING.